United States Patent [19]

Dorey

[11] 3,796,880

[45] Mar. 12, 1974

[54] KEYBOARD HAVING DOUBLE KEY DETECTOR

[75] Inventor: Howard Anthony Dorey, Godalming, England

[73] Assignee: The Solartron Electronic Group Limited, Farnborough, Hampshire, England

[22] Filed: Oct. 10, 1972

[21] Appl. No.: 296,401

[52] U.S. Cl. ............... 250/209, 178/17 C, 197/107, 250/229, 340/365 P

[51] Int. Cl. ........ B41j 5/22, G01d 5/34, G08c 1/00

[58] Field of Search .............. 340/365 P; 178/17 C; 197/107; 250/209, 229

[56] References Cited

UNITED STATES PATENTS

| | | | |
|---|---|---|---|
| 3,056,030 | 9/1962 | Kelchner | 340/365 P |
| 3,603,982 | 9/1971 | Patti | 340/365 |

OTHER PUBLICATIONS

Sharp et al., "Optical Keyboard," IBM Technical Disclosure Bulletin, Vol. 5, No. 10, March, 1963, p. 127

*Primary Examiner*—James W. Lawrence
*Assistant Examiner*—T. N. Grigsby
*Attorney, Agent, or Firm*—Rolyance, Abrams, Berdo & Kaul

[57] ABSTRACT

The invention relates to a particularly simple and economical keyboard, of which the major part, the base, can be made as a one-piece plastics moulding. Thus the base includes two sets of intersecting channels along which radiant energy, particularly light, can be passed, the channels of the first set being perpendicular to the channels of the second set. Keys representing letters, numbers, symbols or the like are arranged at the respective intersections of each pair of channels so as to be capable of controlling the passage of light along the channels. Thus in one embodiment, light is directed along the channels, and the operation of a particular key blocks the passage of the light in the unique pair of channels (one from each of the first and second sets) at whose intersection the particular key is located. Respective photo-electric detectors at one end of each channel produce output signals representative of the particular key operated. A circuit is provided which detects when the energy passing along at least two channels has changed which indicates that at least two keys have been operated.

1 Claim, 9 Drawing Figures

KEYBOARD HAVING DOUBLE KEY DETECTOR

This invention relates to keyboards, and concerns keyboards which upon actuation of a key provide an output code which is peculiar to the character which that key represents.

It is known to provide a keyboard in which actuation of a key controls the passage of radiant energy such as light from a source to a detector. However, in this known type of keyboard, the keys are normally connected, via a relatively complex mechanical linkage including several levers, cams, gears and the like, to control the angular position of a plurality of rotary discs, which have patterns of holes therein to control the passage of light from several light sources to respective photo-electric detectors. Different combinations of the detectors are energised in dependence upon the angular positions of the discs. This known type of keyboard requires considerable precision in its manufacture, and is therefore relatively expensive. Moreover, it is usually necessary to provide it with a relatively complex and expensive mechanical interlock, to prevent inadvertent simultaneous actuation of two or more keys.

It is an object of the present invention to provide a relatively simple and inexpensive keyboard, having relatively few mechanical parts. It is a further object of the invention to provide a keyboard in which the inadvertent simultaneous actuation of two or more keys can be readily detected.

According to the present invention there is provided a keyboard, comprising an assembly of keys, a first set of paths along which radiant energy can be passed and a second set of paths, angularly disposed to the first set, along which radiant energy can be passed, the keys and the first and second sets of paths being so arranged that, in operation, actuation of a key causes a change in the energy passing along each of a unique combination of paths including at least one path from each set and output means for providing an indication of which key has been actuated by detecting the change in energy passing along the unique combination of paths associated with the actuated key.

In one embodiment of the invention means are provided for passing radiant energy along each path in the two sets, and each key is provided with means for reducing, when it is actuated, the energy passing along the unique combination of paths associated with it.

In another embodiment of the invention means are provided for passing radiant energy along each path in the first set, and each key is provided with means for diverting, when it is actuated, energy from the path in the first set associated with it along the path in the second set associated with it. The output means includes radiant energy detection means arranged at the end of each path in the second set to receive energy diverted from a path in the first set, and means are provided for modulating the radiant energy passing along each path in the first set.

Yet another embodiment of the invention, in which the first and second sets of paths are disposed in the same plane or in substantially parallel planes, comprises a third set of paths, one for each key, along which radiant energy can be passed, each third path being arranged co-axially with its associated key, the keys being disposed on one side of the plane, or planes, containing the first and second sets, and the third set being disposed at least in part on the other side of the said plane or planes, a source of radiant energy arranged, in operation, to flood with radiant energy the third set of paths at their ends remote from the keys, and each key is provided with means for directing, when it is actuated, radiant energy from its third path along the unique combination of first and second paths associated with it.

In a further embodiment of a keyboard according to the invention each key includes a shutter member with first and second holes formed therethrough, the shutter members of the keys being so juxtaposed that the first holes align to constitute the first set of paths, and the second holes align to constitute the second set of paths.

Thus the paths may be formed by part of the structure of the key, or separately from the key or by a combination of the two.

Keyboards are generally provided with a mechanical interlock to inhibit 'print-out' when two or more keys are actuated simultaneously. The output means of the present invention can be arranged to provide a 'print-out' signal if it detects that two or more keys have been so actuated.

The present invention will now be described with reference to the accompanying drawings, in which.

Figure 1:
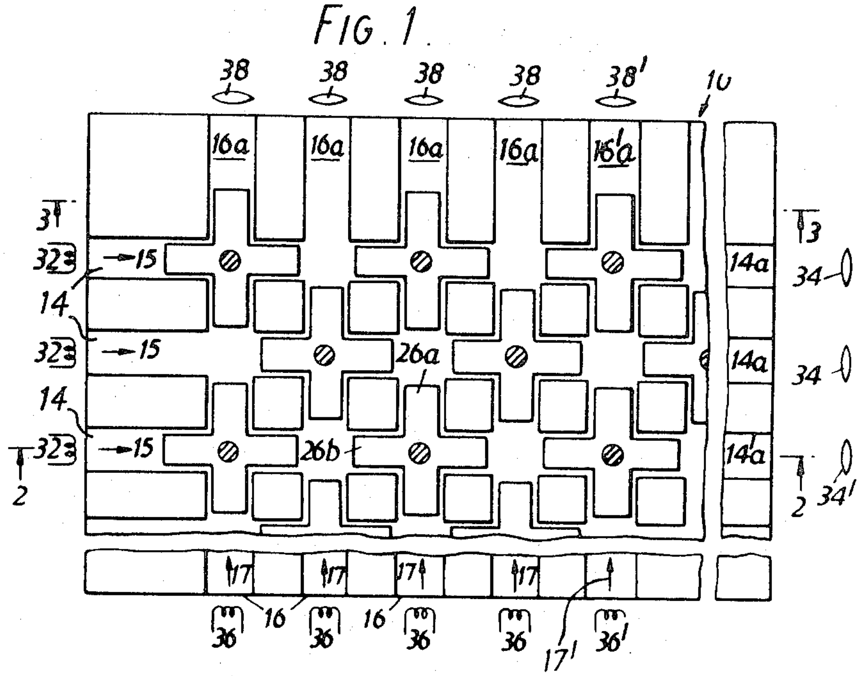
FIG. 1 is a fragmentary, plan view of part of one embodiment of the invention.
Figure 2:
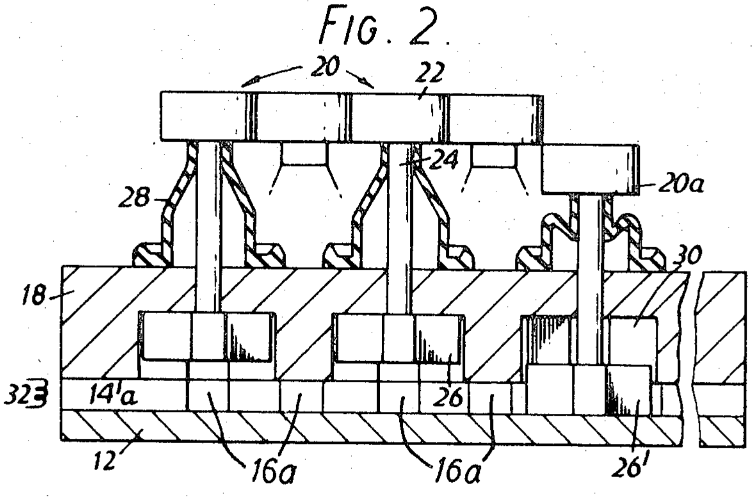
FIG. 2 is a cross-sectional elevation of the keyboard of FIG. 1 taken on the line 2 — 2.
Figure 3:
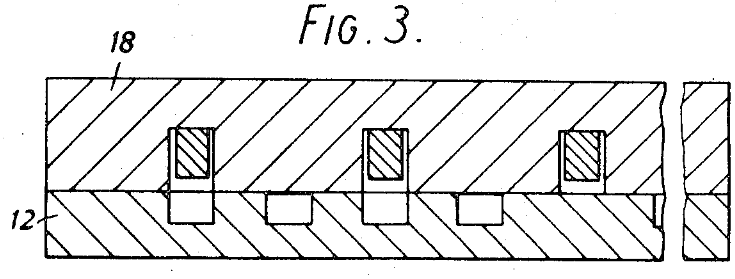
FIG. 3 is a fragmentary, sectional, plan view of the keyboard of FIG. 1 taken along the line 3 — 3.

In the drawings like reference characters are applied to like or corresponding parts Referring first, to FIGS. 1 to 3, there is shown part of a keyboard 10 including a base plate 12 having formed in the upper surface thereof first and second sets 14 and 16 of parallel channels 14*a* and 16*a* disposed in the same plane but normal to each other. A cover member 18 is fixedly attached to the plate 12, the two sets of channels 14*a* and 16*a* and the cover 18 thus forming two sets of enclosed passageways.

A plurality of keys 20 is mounted in the cover member 18, each key being disposed above an associated intersection of a passageway in the set 14 and a passageway in the set 16. Each key 20 comprises a button 22, a key stem 24 and a shutter member 26. The stem 24 of each key is mounted for vertical slideable movement in a corresponding aperture formed in the cover member 18, and the shutter 26 is housed in a corresponding recess 30 formed in the lower part of the cover member 18 when the key is in its rest, or unactuated position.

Each key 20 is provided with resilient means in the form of a rubber cup-like member 28, having a lower rim bearing on the upper surface of the cover 18 and an upper rim, of smaller diameter than that of the lower rim, bearing against the lower surface of the key button 22. When the key is actuated by downward pressure applied to the key button, the key is depressed against the opposing force of the resilient member 28. When the key is released the member 28 provides the restoring force to return the key to its rest position. The resilient member can be designed to operate with a snap action.

When a key is actuated, by downward pressure on its button 22, the shutter 26 extends into one passageway from each set, its downward movement being limited by the upper surface of the base plate 12. Each shutter 26 is in the form of a cross having limbs 26*a* and 26*b*, and is so dimensioned that when a key is actuated, its shutter serves substantially to close one passageway from each set 14, 16, that is, the intersecting passageways immediately below the actuated key. Thus actuation of any one key effectively blocks a unique combination of passageways, one passageway from each set. Key 20*a* (FIG. 2) is shown in the actuated position thus effectively blocking passageways 14*a'* and 16*a'*.

Arranged at one end of each of the passageways in the first set 14 is a light source 32 and at the other end is a corresponding photo-sensitive detector 34. Similar light sources 36 and photo-sensitive detectors 38 are arranged at the two ends of each passageway in the set 16.

Thus in operation, when no key is actuated, light emitted by each source 32, 36 passes along its associated passageway 14*a* and 16*a* (in the direction of arrows 15 and 17 respectively) and is detected by its associated detector 34, 38 respectively. When a key, such as key 20*a* is actuated its shutter 26' blocks the light passing along a unique combination of passageways, namely 14*a'* and 16*a'*, one passageway from each set. The detectors 34' and 38' detect this change in light energy passing along the two passageways and are arranged to generate a coded output signal indicative of which key has been actuated. The actual code generated can be selected according to the particular application of the keyboard. For example, it could be the European Computer Manufacturer's Association standard code 7 (ECMA 7).

Decoding can be achieved by a set of gates, the outputs of which can be used to generate the selected code. This method of decoding is suitable for implementation on a M.O.S. chip. The method of decoding is well known and will not be described in detail but one simple arrangement would require, for M passageways in the first set 14 and N passageways in the second set 16, MN two-input AND-gates, each AND-gate having its inputs coupled to the outputs of a different unique combination of a detector 34 and a detector 38, i.e. one detector associated with each set.

Figure 4:
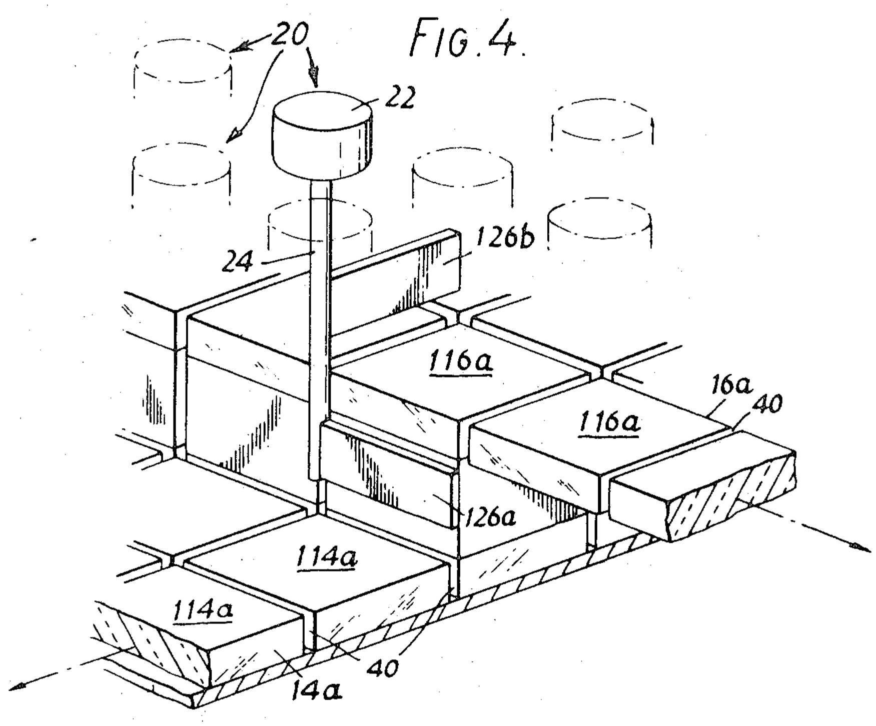
FIG. 4 is a view of part of a second embodiment of a keyboard according to the invention.

FIG. 4 shows part of a second embodiment of a keyboard according to the invention, which is similar in many respects to that of FIGS. 1 to 3. In this embodiment each light transmitting path 14*a* or 16*a* is constituted by a plurality of transparent, rectangular blocks 114*a* or 116*a* as the case may be, arranged in a row with small gaps 40 therebetween. The blocks 114*a*, 116*a* may be of perspex for example. In this embodiment the rows sets of passageways 14 and 16 are arranged in parallel planes, one below the other. The shutter is in two parts comprising a first flat plate 126*a* and a second flat plate 126*b*, arranged one below the other and at right angles to each other near the lower end of the stem 24. The stem of each key is mounted for vertical, slideable movement above an associated intersection of two narrow slots formed by a gap 40 in a row 14*a* and a gap 40 in a row 16*a*.

In operation, when a key is actuated its shutter 126*a* is interposed in a gap 40 between adjacent blocks 114*a* of a passageway 14*a* and its shutter 126*b* is interposed in a gap 40 between adjacent blocks 116*a* of a passageway 16*a*. Thus actuation of any one key effectively blocks a unique combination of light-paths, one from each set 14 and 16.

Illumination of the light-paths and decoding can be achieved in the same way as that described with reference to FIGS. 1 to 3. Light can be confined to the passageways by silvering the surfaces of the blocks which effectively define the passageways.

Figure 5:
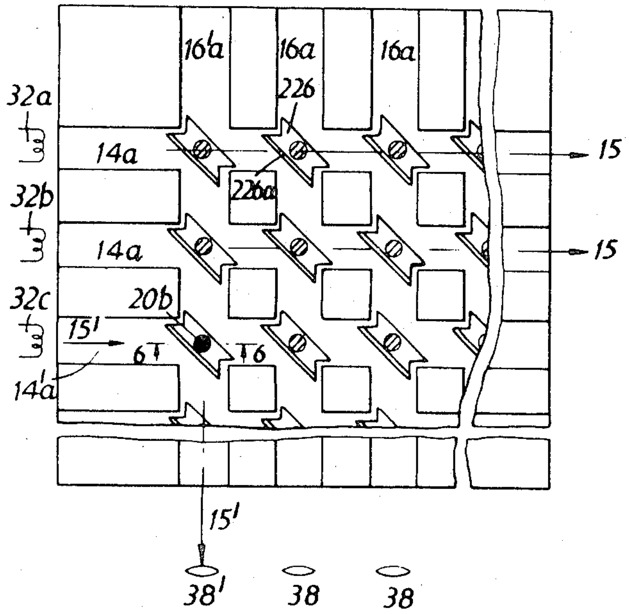
FIG. 5 is a fragmentary, sectional, plan view of part of a third embodiment of a keyboard according to the invention.
Figure 6:
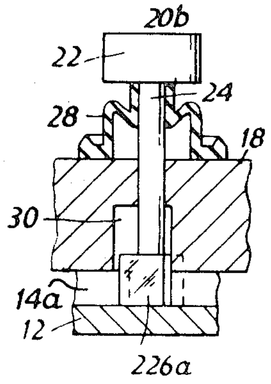
FIG. 6 is a cross-sectional, elevational view of part of the keyboard of FIG. 5 taken along the line 6 — 6.

FIGS. 5 and 6 show part of another embodiment of a keyboard according to the invention wherein the shutter member of FIGS. 1 to 3 is replaced by a member 226 having a reflecting surface 226*a*. The reflecting surface is disposed in a vertical plane, i.e. normal to the plane of the paths 14*a* and 16*a* and at an angle of 45° to the two paths.

In the unactuated position the member 226 is housed in a recess 30 of the cover member 18.

Arranged at one end of each passageway 14*a* in the set 14 is a light source 32*a*, 32*b* etc. and at one end of each passageway 16*a* in the set 16 is a photo-sensitive detector 38. The orientation of the member 226 is such that when a key is depressed, light passing along a passage 14*a* is deflected along a passageway 16*a* and detected by an associated detector 38.

The light sources are energised sequentially, to make a second set of detectors unnecessary.

When a key, such as key 20*b* is actuated a beam 15' of light passing along the passageway 14*a'* is deflected along the passageway 16a' and detected by detector 38'. If the light sources were not energised sequentially it would not be apparent which key in the passageway 16*a'* had been actuated. However, by so energising the light sources, the output of each detector 38 can be coupled in parallel to each of a plurality of associated AND-gates which are opened sequentially in synchronism with the energisation of the sources so that the output of an AND-gate provides an indication of which key has been actuated.

The switching signals for energising sequentially the light sources may be derived from successive stages of a recirculating shift register having a single digit '1' stored therein. The frequency of the shift pulses for the shift register should be selected to be compatible with the response time of the detectors 38. For example, if the light sources are Gallium Arsenide diodes, such as those supplied by Monsanto under type No. M120C1 and the detectors are light activated planar diode switches such as those supplied by Integrated Photomatrix Limited, Dorchester, England, under type No. IPL 11oD, a switching rate of 1KHz would be satisfactory. The infra-red source type M120C1 emits energy at a peak emission wavelength of about 9,000 Angstroms and has turn-on and turn-off times of about 5 nanosecs. The switch types IPL 1100 can have a switch response rate of 5KHz.

Figure 7:
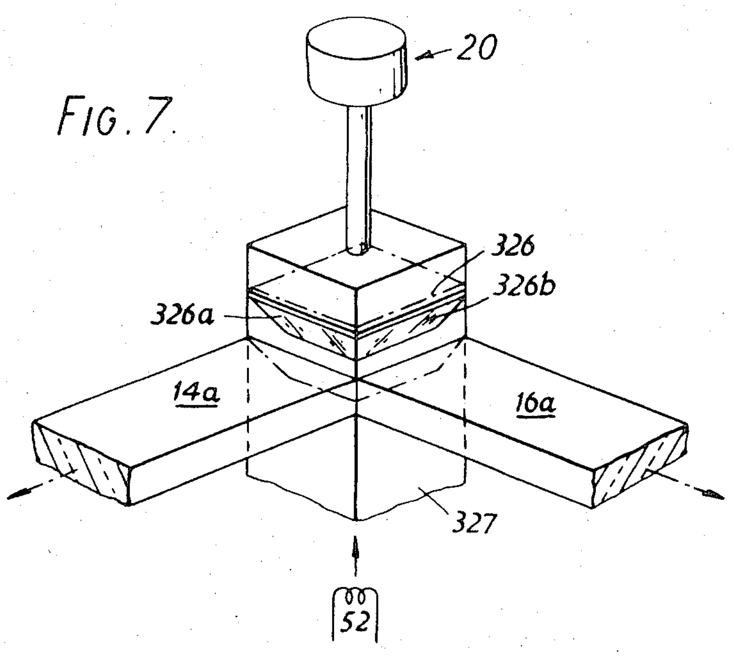
FIG. 7 is a view of part of a fourth embodiment of a keyboard according to the invention.

FIG. 7 shows part of a further keyboard according to the invention. The figure shows one passageway 14*a* and 16*a* from each set of passageways 14 and 16. Attached to the lower end of a key stem 24 is a reflecting member 326 of inverted, frusto-pyramidal form having reflecting surfaces 326*a* and 326*b* on adjacent side walls. In the released position each member 326 is above the intersection of the associated passageways and is mounted for vertical movement in a hollow guide member 327, which constitutes a third passageway along which radiant energy can be passed. Light from a single source 52 is directed upwardly along each guide member 327. In operation, with the keys released light passing up the guides 327 strikes the reflecting surfaces 326*a* and 326*b* and is deflected horizontally but above the passageways 14*a* and 16*a*. When a key is actuated the member 426 is positioned in the intersection of two passageways and light is deflected along its associated passageways 14*a* and 16*a* where it is detected by detectors situated at the end of the passageways. The detectors can be arranged to generate a coded output signal indicative of which key has been actuated, in a manner similar to that described with reference to FIGS. 1 to 3.

Figure 8:
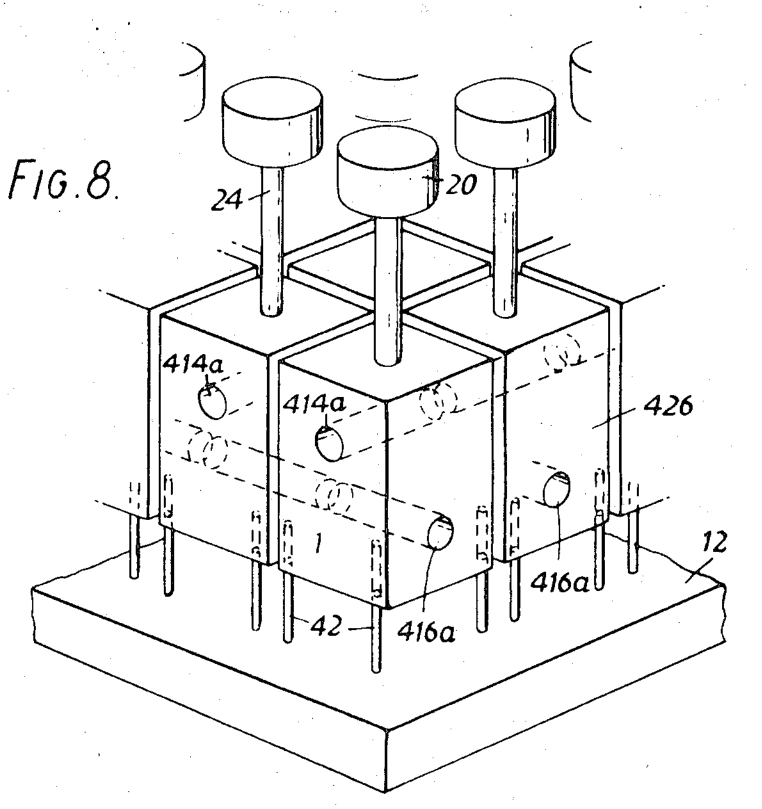
FIG. 8 is a view of part of a fifth embodiment of a keyboard according to the invention.

FIG. 8 shows part of a further keyboard according to the invention. Attached to the stem 24 of each key 20 is a shutter member 426 having first and second holes 414*a* and 416*a* respectively formed therethrough. The shutter members 426 are so juxtaposed that the holes 414*a* align to form the first set of passageways 14 and the holes 416*a* align to form the second set of passageways 16. Each shutter member 426 is mounted for vertical, slideable movement on four support posts 42 mounted on the baseplate 12. Illumination of the light paths and decoding can be achieved in the same way as that described with reference to FIGS. 1 to 3. In operation when a key is actuated its shutter member is displaced downwardly thus breaking a unique combination of light paths formed by the passageways, one passageway from each set.

Embodiments of the invention have been described using radiant energy in the form of light. It is believed that it may be possible to use other forms of electromagnetic energy, or acoustic energy.

Figure 9:
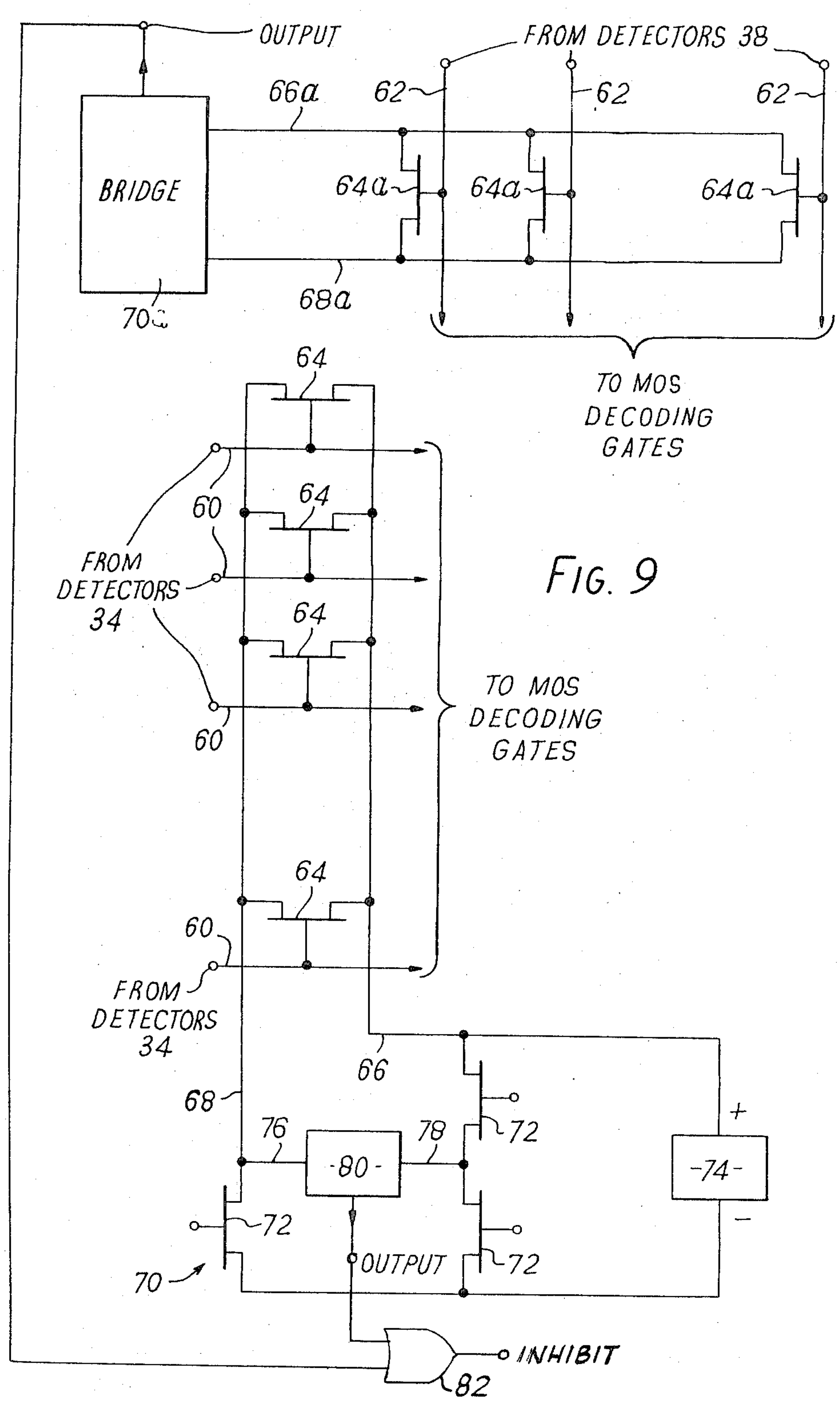
FIG. 9 is a simplified circuit diagram of a circuit for use with the keyboard of FIGS. 1 to 3.

Turning now to FIG. 9, there is shown a circuit for detecting when two or more of the keys 20 of FIGS. 1 to 3 are inadvertently depressed at the same time. The circuit comprises a plurality of input lines 60, each connected to a respective one of the detectors 34 so as to be energised when the respective detector is not receiving light, and a plurality of input lines 62 each similarly connected to a respective one of the detectors 38. It will be appreciated that the lines 60, 62 constitute the input lines to the aforementioned M.O.S. decoding gates.

Each of the lines 60 is connected to the gate of a respective MOSFET 64, having a typical ON resistance of 10 Kohms. The MOSFETs 64 are all connected in parallel with each other between two lines 66, 68 so that they form one arm of a bridge circuit 70. The bridge circuit 70 comprises three further MOSFETs 72 all similar to the MOSFETs 64, and the diagonal thereof which includes the line 66 is connected to receive a reference voltage from a source 74 while the other diagonal is connected between the inputs 76, 78 of a voltage level detector 80. The detector 80 is arranged to produce an output signal when the voltage level between the inputs 76, 78 exceeds a predetermined value.

Each of the lines 62 is connected to the gate of a respective MOSFET 64*a*, which is similar to the MOSFETs 64 and which is connected in similar manner to that described with reference to the MOSFETs 64 to a bridge circuit 70*a* identical to the bridge circuit 70.

In operation, the MOSFETs 72 in the bridge 70, and the corresponding MOSFETs in the bridge 70*a*, are all arranged to be conducting, i.e. ON. When none of the keys 20 is depressed, none of the MOSFETs 64, 64*a* is turned on, so the input 76 of the detector 80 is negative with respect to the input 78. The detector 80 therefore produces no output signal. For similar reasons, the detector in the bridge 70*a* also produces no output signal. When one key 20 is depressed, then one MOSFET 64 and one MOSFET 64*a* is turned ON, so that the bridges 70, 70*a* are balanced. In this case, again neither detector produces an output signal. However, if two of the keys 20 are inadvertently depressed at the same time, then two MOSFETs 64 are turned ON and/or two MOSFETs 64*a* are turned ON. The input 76 of the detector 80 in the bridge 70 is therefore rendered positive with respect to the input 78, and/or a similar situation arises in the bridge 70*a*. In this case, the detector 80 and/or the detector in the bridge 70*a* produces an output signal, indicating simultaneous depression of two keys. The output signals from the detectors in the bridges 70, 70*a* can be combined in an OR gate 82 whose output is used to inhibit the operation of the aforementioned MOS decoding gates and to energise a fault indicator which tells the user of the keyboard to try again.

I claim:

1. A keyboard comprising an assembly of keys; a first set of paths along which radiant energy can be passed; a second set of paths, angularly disposed relative to said first set, along which radiant energy can be passed, said keys and said first and second sets of paths being so arranged that, in operation, actuation of a key causes a change in the energy passing along a unique combination of paths including at least one path from each of said sets; and output means for providing an indication of which key has been actuated by detecting the change in energy passing along the unique combination of paths associated with the actuated key, said output means comprising means for detecting when the energy passing along at least two paths of either one of the sets of paths has been changed, whereby to indicate that at least two keys have been actuated.

* * * * *

UNITED STATES PATENT OFFICE
CERTIFICATE OF CORRECTION

Patent No. 3,796,880 Dated March 12, 1974

Inventor(s) HOWARD ANTHONY DOREY

It is certified that error appears in the above-identified patent and that said Letters Patent are hereby corrected as shown below:

Add the following new dependent claims 8-12:

-- 2. A keyboard as claimed in claim 1, and further comprising means for passing radiant energy along each path in the two sets, and means on each key for reducing the energy passing along the unique combination of paths associated with it when the key is actuated.

3. A keyboard as claimed in claim 1, and further comprising means for passing radiant energy along each path in the first set, means for modulating the radiant energy passing along each path in the first set, and means on each key for diverting energy from the path in the first set associated with it when the key is actuated and wherein said means for detecting radiant energy includes means arranged at the end of each path in the second set to receive energy diverted from a path in the first set.

4. A keyboard as claimed in claim 1, wherein said first and second sets of paths are disposed in substantially parallel planes, and wherein there is further provided a third set of paths including one path for each key along which radiant energy can be passed, each third path being arranged co-axially with its associated key, the keys being disposed on one side of said planes containing the first and second sets, said third set being disposed at least in part on the other side of said planes a source of radiant energy arranged, in operation, to flood with radiant energy said third set of paths at their ends remote from the keys, and wherein each key is provided with means for directing, when it is actuated, radiant energy from its third path along the unique combination of first and second paths associated with it.

5 . A keyboard as claimed in claim 1, wherein each key includes a shutter member with first and second holes formed therethrough, the shutter members of the keys being so juxtaposed that the first holes align to form the first set of paths, and the second holes align to form the second set of paths.

6 . A keyboard as claimed in claim 1, wherein the radiant energy is light from at least one light source, and said output means includes a respective photo-electric detector associated with each path of at least one of the sets of paths.--

Signed and sealed this 24th day of September 1974.

(SEAL)
Attest:

McCOY M. GIBSON JR.
Attesting Officer

C. MARSHALL DANN
Commissioner of Patents